June 12, 1923.
E. G. FREED
1,458,475
ATTACHMENT FOR WEIGHING SCALES
Filed April 1, 1921
3 Sheets-Sheet 1
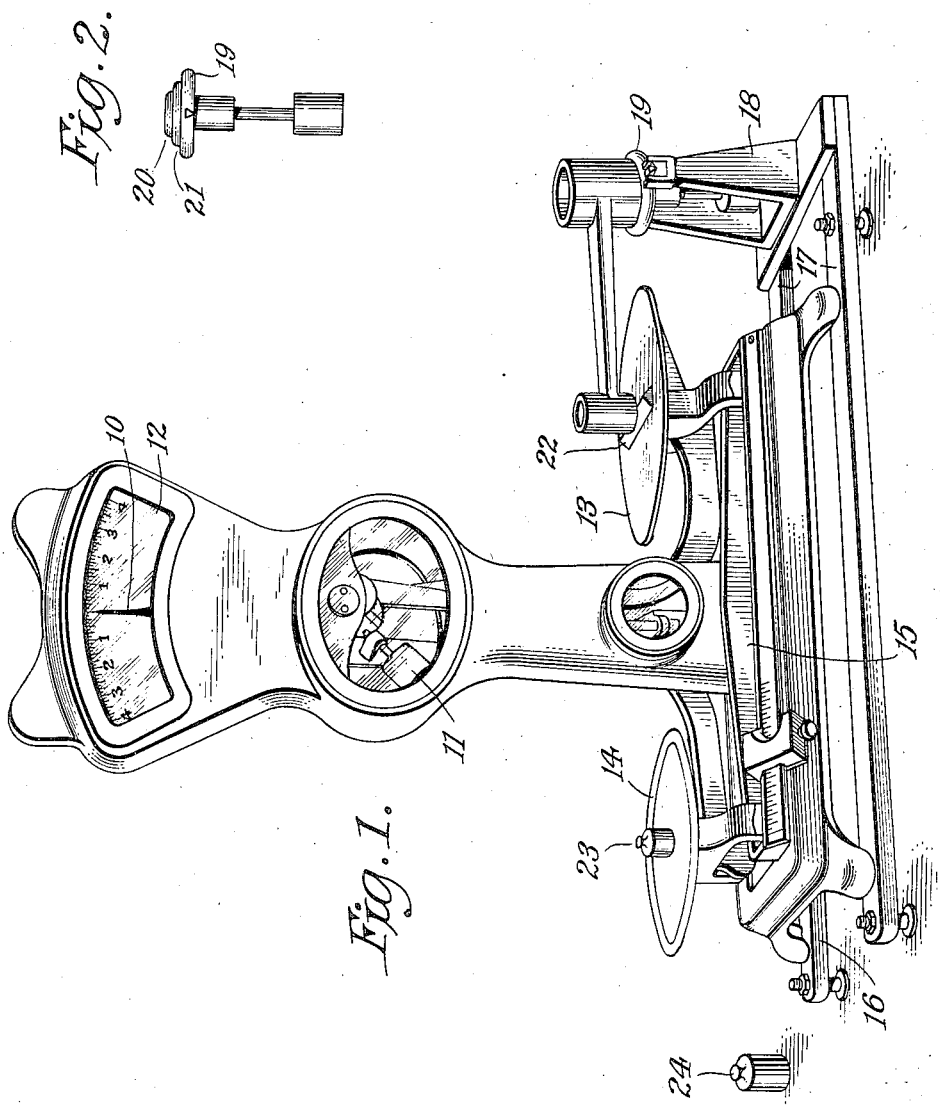

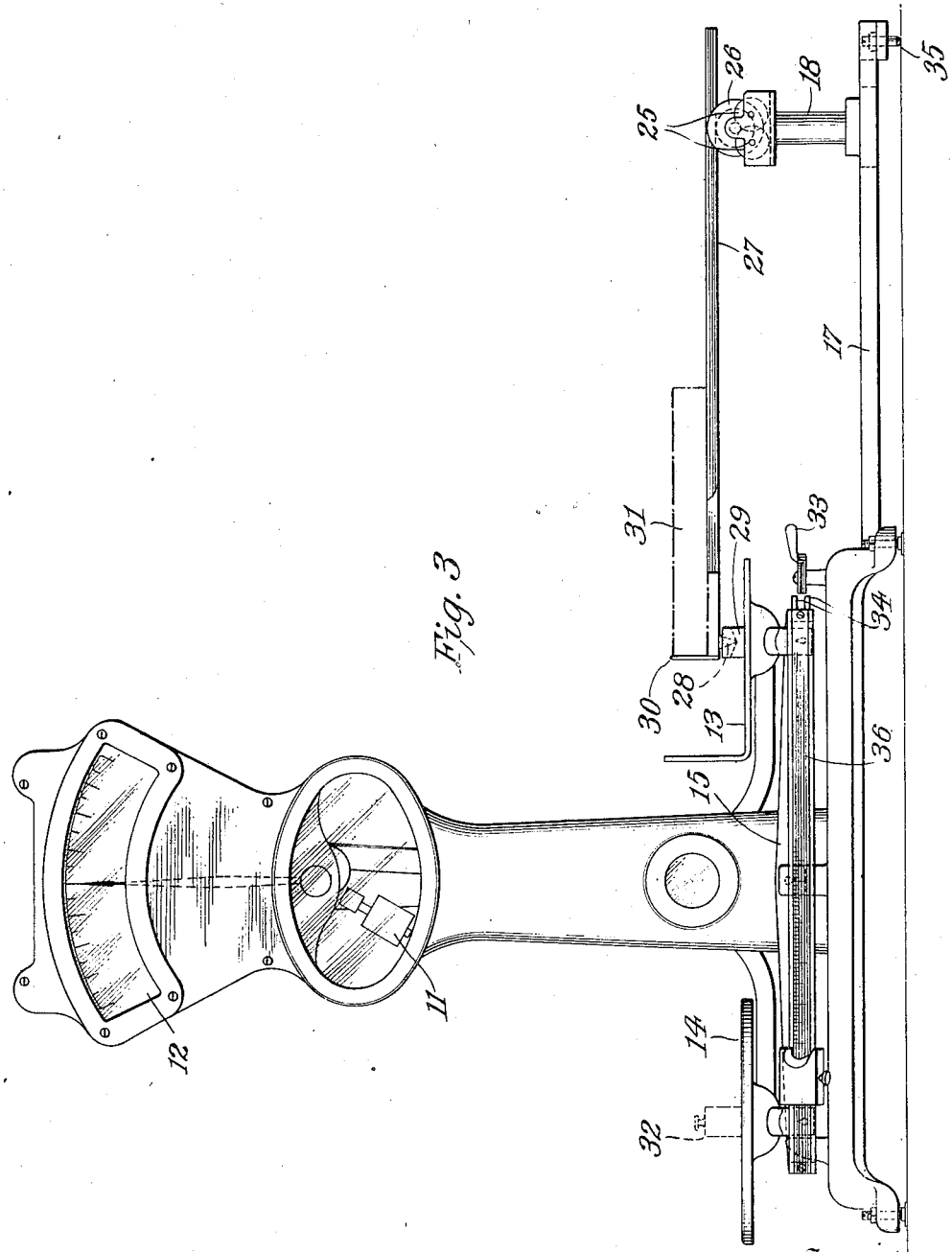

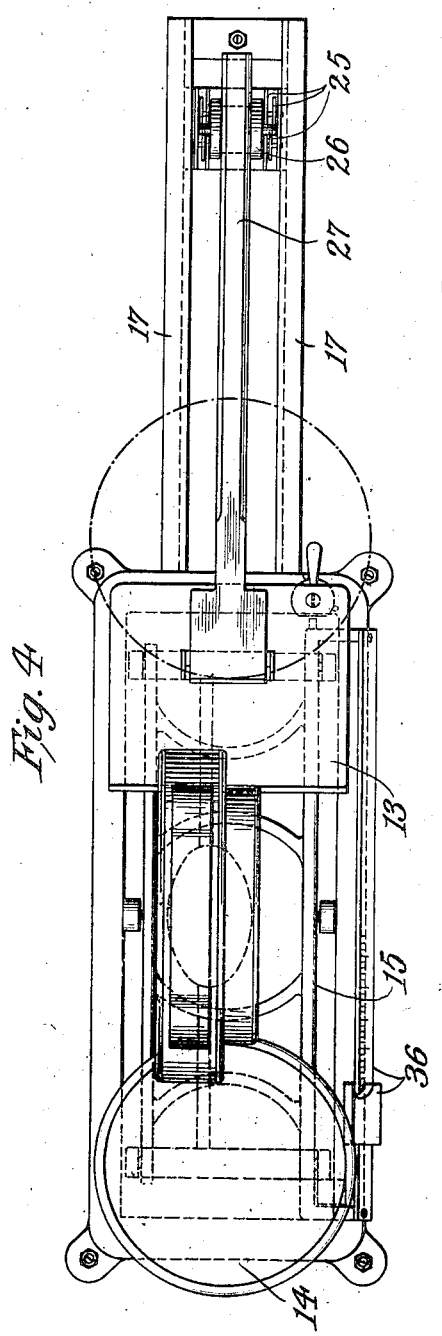
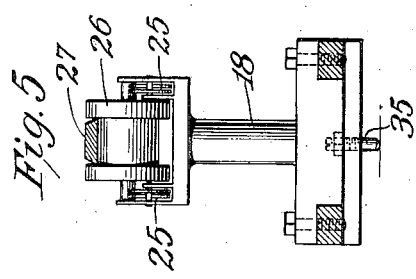
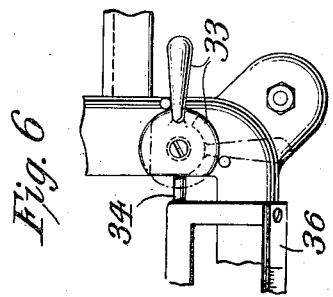

Patented June 12, 1923.

1,458,475

UNITED STATES PATENT OFFICE.

EDWARD G. FREED, OF DAYTON, OHIO, ASSIGNOR, BY MESNE ASSIGNMENTS, TO DAYTON SCALE COMPANY, OF DAYTON, OHIO, A CORPORATION OF NEW JERSEY.

ATTACHMENT FOR WEIGHING SCALES.

Application filed April 1, 1921. Serial No. 457,639.

*To all whom it may concern:*

Be it known that I, EDWARD G. FREED, a citizen of the United States of America, residing at Dayton, in the county of Montgomery and State of Ohio, have invented certain new and useful Improvements in Attachments for Weighing Scales, of which the following is a full, clear, and exact description.

The present invention resides in improvements in weighing scales and more particularly in improvements in appliances to be used in standardizing the weights of parts which are desired to be kept within certain weight limits.

It is particularly desirable to attaining a good running balance of various machines that various reciprocating and rotating parts be kept within standard weight limits and that the parts be rotatably balanced. Emery or other grinding wheels, for example, should have their mass so distributed that the wheel is rotatably balanced. Wheels which are found to be out of balance should be suitably marked at various points on their periphery with the over or under weight so that they may be trued.

Automobile connecting rods also present a particular problem. These rods should be grouped in sets, each rod having a weight substantially equal to the weight of the other rods of the set. In addition, the distribution of weight as between the heavy and light ends, should bear a certain ratio and be kept as close as possible to fixed standards. If these standards are departed from, the individual rods of a set should be alike as regards distribution of weight between the light and heavy ends.

The present invention has for its objects the provision of a weighing scale which may be used for standardizing operations of the character above explained, to the end that the parts to be standardized may be expeditiously and inexpensively handled and marked with a weight amount which represents the difference of the part or a portion of the same from a fixed standard.

In the drawings:

Fig. 1 shows one embodiment of my invention which is particularly adaptable for use in standardizing connecting rods and like parts.

Fig. 2 is a detail showing the pivoted rod holder.

Fig. 3 shows another embodiment of the invention and shows an apparatus which may be used in standardizing heavy articles such as grinding wheels and the like.

Fig. 4 shows a top plan view of the scale and associated parts shown in Fig. 3.

Fig. 5 is a detail of a relieving attachment.

Fig. 6 is a detail end view of certain of the parts shown in Fig. 5.

In more detail, the scale used is of the well-known even balance type having an indicating pointer 10 and automatic counterbalance 11 so adjusted and related that with the scale in balance the pointer 10 will stand at zero in the center of the chart 12. If the weight on the right hand pan 13 exceeds the weight upon the left hand pan 14, the pointer will swing to the right and indicate the average upon the right hand side of the chart. If the weight upon the right hand pan is less the pointer will move to the left and indicate the amount which the article is under the weight upon the left hand side of the chart. Scales of this type, having an even balance lever 15 supporting the pans, are well known in the art and require no detailed description. Reference may be made to Hopkinson Patents Nos. 817,777 and 1,291,890 for a further description of such even balance scales, having a supplementary automatic counterbalance.

The scale base 16 has an extension 17 which carries a forked standard 18. This standard is provided with suitable bearings to receive knife edges of a carrier element 19. The carrier is provided with a pendulum to maintain the same in upright position and is also provided with stepped shoulders 20 and 21 of proper size to receive and position a connecting rod or other apertured part in a predetermined position upon the carrier. Upon the right hand pan is a knife edge pivot 22.

The method of balancing a rod will be readily understood. The rod is placed upon the carrier with the large end opening fitting the step 21. The small end is placed upon the knife edge 22. A standard weight 23 of a value equivalent to the standard weight of the light end of the rod is then placed upon the left-hand pan. The over or under reading is then taken and the end marked with the chart reading.

For standardizing the heavy end the connecting rod is merely reversed and a proper weight 24 placed upon the left-hand pan.

For weighing and standardizing heavy articles and for operations such as balancing a wheel or disk at a plurality of points the construction shown in Figs. 3 to 6 is preferable. The standard 18 carries suitable rotatably mounted disk bearings 25 which rotatably support a roller 26. This roller is preferably grooved as shown in Fig. 5 to align a carrier bar 27. This bar extends over the right-hand scale pan 13 and is provided with a suitable knife pivot 28 resting in a V bearing 29 carried by the pan. The pivot 28 and bearing are preferably so disposed that they are vertically aligned with the pan pivots on the even balance beam. At its left end the carrier bar is widened and provided with an end abutment plate 30.

When in use the disk or other member, as shown in dotted lines at 31 in Figs. 3 and 4, is placed upon the carrier bar and its periphery abutted against the upstanding end 30. A standard weight 32 is then placed upon the left-hand scale pan and a chart reading taken. The over or under weight is marked upon the disk and the latter is then turned around and a reading taken at one or more additional points as desired. The disk may then be trued up in any desired manner.

In order to prevent damage to the scale pivots when the disks are being applied to the carrier bar, I provide a relieving gear such as shown in Fig. 6. A cam lever 33 is pivoted upon some fixed part of the scale and may be turned to engage a pin 34 and elevate the scale beam 15 slightly so that the shock of impact of disk will come upon the relieving gear instead of coming directly upon the pivots.

The extended frame may be kept from springing when heavy loads are applied by a suitable screw 35 which extends downward and contacts with the supporting platform.

The carrier bar type of construction permits disks of differing diameters to be standardized. It is only necessary that the periphery of the disk be placed in abutting relation with the abutment 30.

If desired, the standardizing attachments can be entirely removed and the scale used for ordinary weighing operations. I, therefore, provide the even balance beam with a suitable tare beam and poise 36.

I claim:—

1. In an apparatus of the class described, an even balance weighing scale having an automatic counter-balance, an over and under chart and cooperating pointer and weight pans, in combination with means for supporting an article to be standardized comprising a pivot-like support carried by one of the weight pans, and a supplementary pivotal support remote from the weight pan, said supports conjointly supporting the article to be standardized whereby a portion of the weight thereof reacts upon the supporting weight pan of the scale.

2. In an apparatus of the class described, an even balance scale having a pair of weight pans, an over and under chart and cooperating pointer and counterbalance, a pivot support upon one of said weight pans, a supplementary pivotal support adjacent thereto, said pivotal supports being adapted to cooperate and conjointly support an article which is to be standardized with respect to a predetermined weight upon the other weight pan.

3. In combination, an automatic scale having an over and under chart, a cooperating pointer and a weight pan, a pivotal support for the article to be standardized upon the weight pan, a second pivotal support for said article at a predetermined distance from the first mentioned support, and means for locating an article to be standardized at definite distances from the said pivotal points of support.

4. In combination, an even balance scale having a plurality of weight pans, an over and under chart, a cooperating pointer and counterbalance, a support for an article to be standardized upon one of said weight pans, and a second supporting means for said article remote from and at a fixed distance from the aforesaid support.

5. An attachment for a weighing scale to permit the standardizing of the weight of portions of an article with respect to a fixed standard comprising an extension from said scale, a pivotal support carried thereby and a carrier cooperating therewith and having provisions for receiving an article and locating the same with respect to said pivotal point.

6. An attachment for an even balance weighing scale to permit the standardizing of the weight of a portion of an article against a fixed standard comprising an extension from the scale frame, a standard carried thereby, a pivotally mounted member supported thereon, a carrier supported conjointly by said member and by a pan of the scale, and an abutment on said carrier to determine a limiting position of articles placed thereon to be standardized.

7. An attachment for a weighing scale having a pan, a pointer and an over and under chart, comprising an extension from said scale, a standard carried thereby, a grooved roller rotatably mounted upon said standard, a carrier bar supported at one end by said grooved roller and at the other by a pivotal support upon the scale pan, and an abutment upon said carrier bar to determine the position of an article which is placed thereon to be standardized.

In testimony whereof I hereto affix my signature.

EDW. G. FREED.